May 30, 1933.  H. CREMER  1,911,607
FRONT WHEEL DRIVE FOR MOTOR VEHICLES
Filed Nov. 27, 1931   3 Sheets-Sheet 3

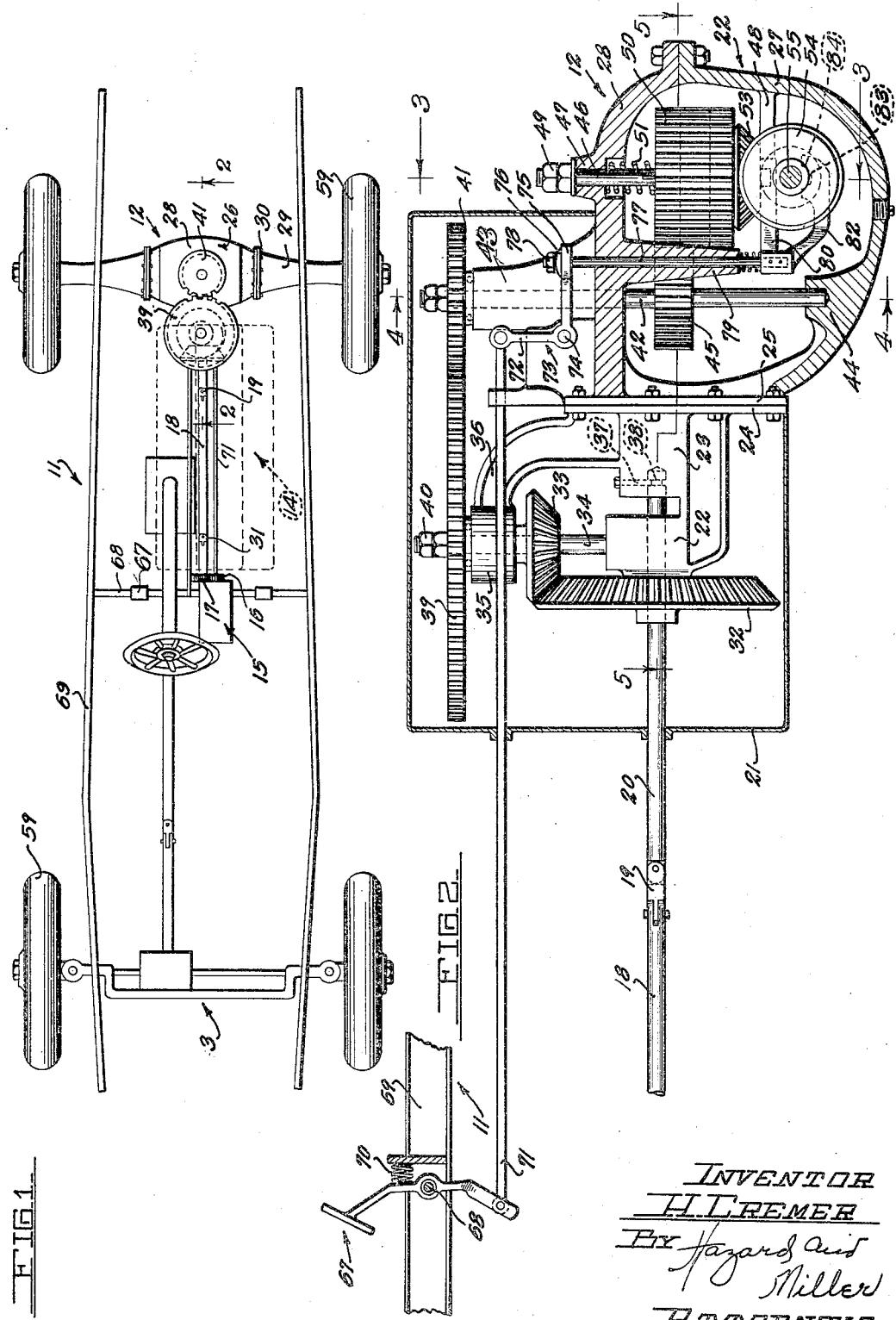

INVENTOR
H. CREMER
By Hazard and
Miller
ATTORNEYS

Patented May 30, 1933

1,911,607

UNITED STATES PATENT OFFICE

HENRY CREMER, OF SOUTHGATE, CALIFORNIA

FRONT WHEEL DRIVE FOR MOTOR VEHICLES

Application filed November 27, 1931. Serial No. 577,490.

In connection with a front wheel drive for motor vehicles one of the objects and features of my invention is the means of transmitting power from a transmission having variable speed ratios to the front axle and to both wheels of such axle, the wheels being mounted each on a separate shaft and the drive being communicated directly to the two parts of the front wheel shafts.

Another feature of my invention in regard to the front wheel drive is the elimination of the ordinary differential and employing a manually controlled drive for the front wheel shaft by which both of the wheels may be positively driven or one may be positively driven to the omission of the drive of the other and thus provide for turning the vehicle.

In my construction the front wheels are rigidly connected to the front wheel drive shafts and do not swivel on the turns. The steering is done by the rear wheels and may be in accordance with the construction set forth in my patent application Serial No. 570,420 filed October 22, 1931, now Patent No. 1,897,551 dated Feb. 14, 1933, for rear axle steering with front wheel drive.

An object and feature of my invention as relates to the construction of the axle and the drive is that I employ a substantial axle housing with a gear case therein having a pair of parallel vertical shafts, each of which is provided with a beveled gear which meshes with the pivoted gear on each of the front wheel shafts. A drive from the transmission through suitable gear reduction, if desired, is communicated to one of the gears on these vertical shafts and communicated from such gear to the other, both of which gears may be raised or lowered on its shaft to engage or disengage the beveled gear thereon from the beveled gear on the wheel shaft. Thus both of the wheel shafts may be simultaneously driven or one driven and the other having no drive or, if desired, both may be free for the free running of the vehicle with no positive drive to the front wheels. One of the features of being able to drive one front wheel and omit the drive from the other is that the turning of the vehicle is facilitated and the positive drive of one wheel tends to make the steering easier as well as affording less wear on the tires.

Another detailed feature of my control of the drive to the two front wheel shafts is the employment of a foot pedal control, there being two pedals, one for controlling the raising or lowering of the beveled gears driving the front wheel shafts, each pedal also operating a brake applied to the shaft from which the drive has been removed to retard the rotation of such shafts and, hence, of the wheel on one side of the vehicle.

My invention is illustrated in connection with the accompanying drawings, in which:

Fig. 1 is a plan of a vehicle chassis showing certain parts of my equipment;

Fig. 2 is a vertical longitudinal section on the line 2—2 of Fig. 1 in the direction of the arrows, certain of the gears and shafts being shown in elevation;

Figure 3:
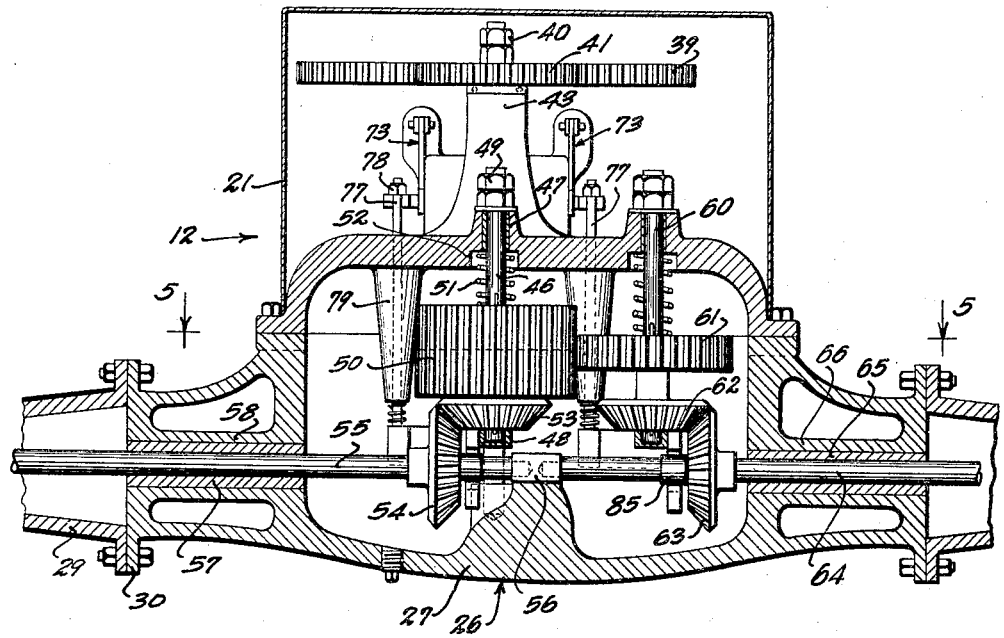
Fig. 3 is a vertical transverse section on the line 3—3 of Fig. 2 in the direction of the arrows, showing certain of the gears and shafts in elevation.
Figure 4:
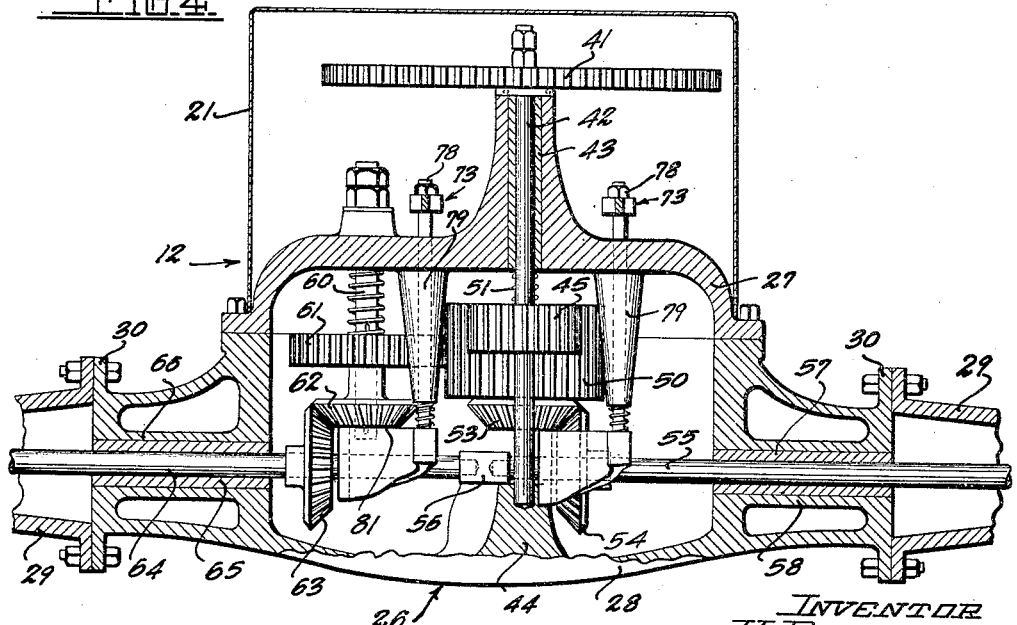
Fig. 4 is a vertical transverse section on the line 4—4 of Fig. 2 in the direction of the arrows, showing certain gears and shafts in elevation.

In the drawings I illustrate a vehicle frame 11 in which may be suitably mounted a front axle assembly 12 and a rear axle assembly 13. This latter may have a steering mechanism built in accordance with my above mentioned patent application. The location of the engine is indicated dotted by the lines 14 and there is a drive from the engine in a conventional manner to a transmission 15. This transmission has a drive gear 16 at the front which communicates a drive to a driven gear 17, this having a drive shaft 18. This shaft has a universal joint 19. The forward end 20 passes through a gear housing 21 and is journaled in a journal block 22 secured to the block 23, this latter having a substantial flange 24 and attached to the rear portion 25 of the front wheel shaft gear case 26. This gear case is illustrated as having a lower section 27 and an upper section 28 secured together and two tapering hollow axle housings 29 which are bolted to the ends 30 of the front wheel shaft gear case 26.

The shaft 18 is journaled at one end to the transmission case 15 and has a universal joint 31 as well as the universal joint 19. The end 20 of this drive shaft 18 has a beveled gear 32 thereon which meshes with the beveled pinion 33 which is on a vertical shaft 34. This shaft is journaled in the journal block 22 and in a journal 35 on the upper end of a bracket 36, the bracket 36 being secured to the block 23. Any end play of the shaft 20 is prevented by a screw 37 extending through part of the block 23 and into a groove 38 adjacent the end of the shaft. On the upper end of the vertical shaft 34 there is secured a large gear 39, this being held in place by nuts and lock nuts 40 and this gear meshes and drives a smaller gear 41 on a vertical shaft 42. Such shaft has an upper journal 43 extending upwardly from the upper section 28 of the gear case 26 and in a lower journal 44 formed in the lower section 27 of this gear case. A pinion gear 45 is carried by the vertical shaft 42.

The drive from the gear 45 to the wheel shafts and wheels is as follows:

A first stub shaft 46 is journaled in an upper journal 47 in the upper section 28 of the crank case and has its lower end journaled in a cross bracket 48 secured to the lower part of the gear case. A nut and lock nut 49 limit the downward movement of this shaft which may slide vertically in its journal as well as rotate, and on this shaft there is a wide gear 50, such gear being keyed to the shaft. A compression spring 51 bears on the gear and also on a seat 52 in the upper part of the gear case. A beveled gear 53 is also keyed on the shaft 46 and this gear meshes with a beveled gear 54 secured to one of the wheel shafts 55, which wheel shaft is journaled at its inner end in a journal box 56 extending upwardly from the lower part 27 of the gear case 26. It has a second bearing in a bushing 57 of the side portion 58 of the gear case. There is also another journal, not illustrated, at the outer end of the axle housing 29 adjacent one of the driving wheels 59.

A second vertical stub shaft 60 is mounted in a similar manner to the shaft 46 having a journal at the top and a journal in a lifting arm at the bottom. This shaft also carries a gear 61, which gear is narrower than the gear 50 and meshes therewith. A compression spring similar to the spring 51 is used in connection with this gear 61 and the upper part of the gear case. A beveled gear 62 is secured to the shaft 60 below the gear 61 and meshes with a beveled gear 63 which is secured to a wheel shaft 64, which shaft is also journaled at the center in the center journal 56 at the bottom of the gear case and in a bushing 65 in the side portion 66 of the gear case opposite the side portion 58. This shaft also has another journal for the other driving wheel.

From the above gear train it will be seen that a drive is communicated by the engine through the medium of the variable transmission 15 to the gear 16, from thence to the gear 17 on the drive shaft 18, through the medium of the large beveled gear 32, the beveled gear 33 to the shaft 34, through the gears 39 and 41 to the shaft 42, from the gear 45 on this shaft to the gear 50 and hence to the gear 61, and as the gear 53 driven with a gear 50 through the medium of the beveled gear 54 drives one of the wheel shafts, and the gear 62 operating with the gear 61 through the beveled gear 63 drives the other wheel shaft, both of these wheel shafts are rotated at the same speed and in the same direction.

Figure 5:
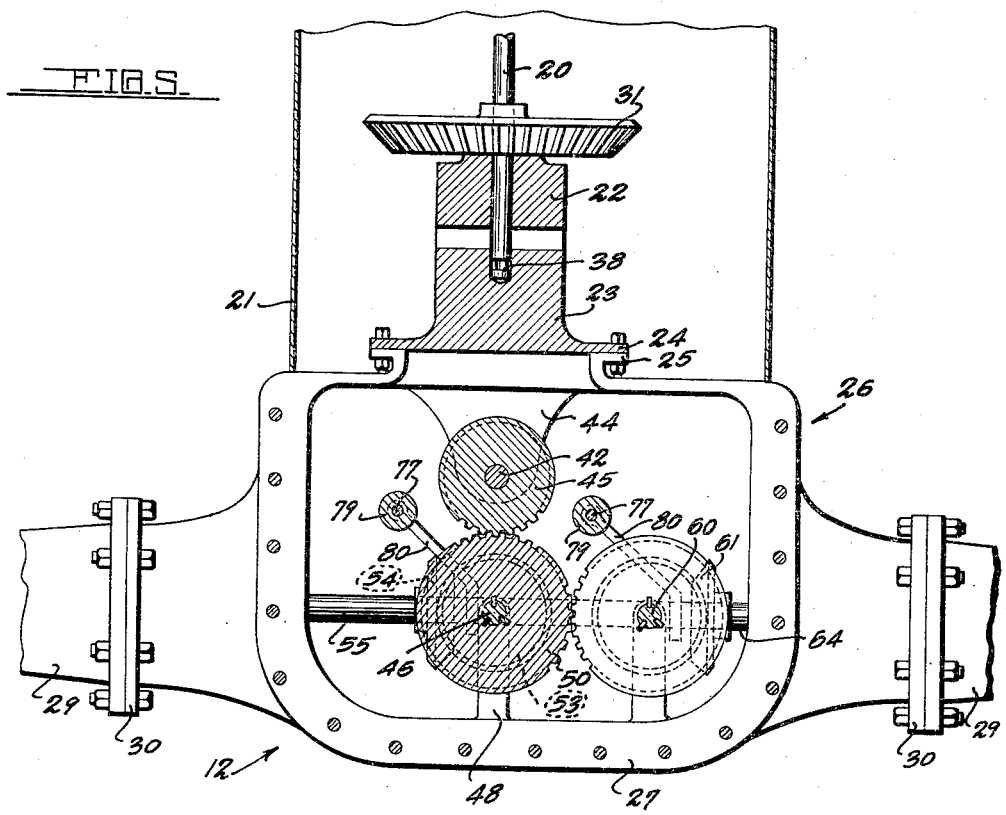
Fig. 5 is a horizontal section on the line 5—5 of Fig. 3 in the direction of the arrows, showing certain shafts and gears in plan.
Figure 6:
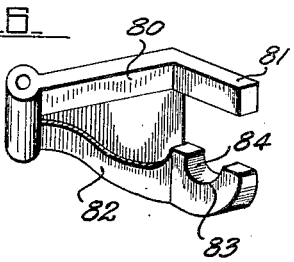
Fig. 6 is a detail in perspective of the assembly for connecting and disconnecting the drive gears and applying the brakes to the wheel shafts.

The manner of raising and lowering the beveled drive gears 53 and 62 utilizes a pair of foot pedals 67, but one being shown, which are pivoted on a bar 68 secured to the side members 69 of the vehicle. A compression spring 70 for each pedal urges the pedal in its inactive position. Each pedal is connected to an operating link 71 which extends longitudinally of the vehicle frame and is connected to one side 72 of the bell crank 73, such bell crank being pivoted at 74 to the journal 43 or equivalent support. The other end 75 of the bell crank is slotted and has an arcuate upper surface 76. A lifting rod 77 has an adjusting nut 78 at the top. The rod fits through the slotted end of the end 75 of the bell crank and bears on the upper convex surface. Each of the lifting rods 77 is slidable in a depending stud 79, such stud extending downwardly in an axle assembly housing 12. The lower end of each rod 77 is attached to a bracket. Each bracket has an upper arm 80 which extends at an angle to the shafts 55, as illustrated in Fig. 5, and has a top portion 81 at an obtuse angle therewith. A lower arm 82 is vertically below the arm 80. This lower arm has a brake-applying structure with a concave upper surface 83, this having a brake lining 84. This structure, with concave surface 83 and brake lining 84, is vertically below the top portion 81. The arms 80 and 82 are connected by a strengthening web. The brake lining is adapted to engage a brake collar 85 on the shaft 55.

There is a second lifting rod similar to that above described also having a lateral upper and lower arm, one to engage under the gear 62 and the lower or brake arm to engage a collar on the shaft 64. The gears are splined on these vertical shafts 46 and 60, which shafts rotate, and when either pedal is pressed it will raise one or the other of the sets of drive gears 53 or 62. The gear 50 is made wide so that no matter to what extent it is raised relative to the gear 61 or the gear 61 elevated in regard to the gear 50 it will also remain in mesh, but as above described the drive is between the gears 53 and 54 or 62 and 63. In operation when it is desired to make a turn, the driver presses the foot pedal 67 which operates the drive release on the side of the vehicle toward which the turn is to be made. This, therefore, throws the front wheel on one side out of driving relation to the engine and the engine continues driving the opposite or outer wheel of the turn. The engine, therefore, operates to aid the turning of the vehicle and when the course is again straightened out the pedal may be released, thus lowering one or the other of the sets of gears 50 or 53 or 61 and 62, thus again bringing the gear that was raised into mesh with its beveled pinion on one of the wheel shafts. Manifestly, if it is desired to allow the vehicle to coast without the engine driving both pedals may be depressed and thus raise both of the drive gears 53 and 62.

Various changes may be made in the details of construction without departing from the spirit or scope of the invention as defined by the appended claims.

I claim:

1. A motor vehicle having an axle housing, a pair of wheel shafts in alignment rotatably mounted therein, each having a driven gear, a wheel operatively connected to each shaft, a pair of vertical transmission shafts, each having a drive gear to mesh with one of said driven gears, a first transmission gear on one of the vertical shafts, a second transmission gear on the other vertical shaft, said transmission gears on the vertical shafts meshing, a power mechanism, and a drive to the first transmission gear, and means to at will raise either driving gear and the transmission gear on the same shaft or to raise both driving gears and transmission gears to drive or discontinue driving either one or both of the wheels.

2. A motor vehicle as claimed in claim 1, said wheel shafts having each a brake collar and brake arms operated in lifting the driving gears to apply a brake action to the collar of the non-driven shaft.

3. A motor vehicle having an axle housing, a pair of wheel shafts rotatably mounted therein, each having a driven gear, a wheel operatively connected to each shaft to rotate in a constant plane, a pair of transmission shafts, each having a transmission gear thereon in mesh one with the other, and means to positively drive one of said transmission gears, each transmission shaft having a driving gear meshing with one of the driven gears on the axle shafts, a pair of slidable rods, each having means to connect with one of the driving gears to shift said gear into and out of driving relation with the driven gear, and means to at will operate each of the rods whereby either or both of the wheels may be driven or one or both of the wheels may be non-driven.

4. A motor vehicle as claimed in claim 3, each rod having a brake applying element operatively connected thereto, and each wheel shaft having a brake collar, the braking element being applied to a collar in the movement of the rod to disengage the drive of a driving and driven gear.

5. A motor vehicle having an axle housing, a pair of wheel shafts rotatably mounted therein, each having a driven gear, a wheel operatively connected to each shaft to rotate in a constant plane, a pair of vertical transmission shafts, each having a transmission gear thereon, said gears meshing, and each transmission shaft having a driving gear operatively connected to the transmission gear thereon, means to drive one of the transmission gears, a pair of vertical rods, means to reciprocate each rod at will, and a lifting device connected with each rod to lift a driving gear out of mesh with a driven gear, and a spring to return the driving gear into mesh with the driven gear on reciprocation of the rod in the opposite direction.

6. A motor vehicle as claimed in claim 5, the means to drive the transmission gear comprising a third vertical shaft having a pinion gear thereon meshing with one of the transmission gears, and means to drive said pinion gear.

7. A motor vehicle having an axle housing, a pair of wheel shafts in alignment rotatably mounted therein and each having a driven gear, a wheel operatively connected to each shaft to rotate in a constant plane, a pair of vertical transmission shafts, each having a transmission gear thereon meshing together, and each having a driving gear operatively connected to the transmission gear mounted thereon to mesh with and drive one of the driven gears on a wheel shaft, a pair of vertically reciprocating rods, and means to operate each rod at will to lift and lower the rods, a lifting device connected with each rod and operatively connected to one of the driving gears to lift such gear out of mesh with its driven gear, a brake device also operatively connected to each rod, a brake collar on each axle shaft, the brake device engaging the brake collar on elevation of said rod and on disconnecting the drive from a driving gear to a driven gear, and means to bring a driving gear into mesh with its driven gear on lowering of a rod.

8. A motor vehicle as claimed in claim 7, a third vertical shaft rotatably mounted and having a pinion thereon meshing with one of the transmission gears, a fourth vertical shaft, a drive between the fourth and the third shaft, a horizontal shaft leading to an engine drive, and means to transfer a drive from the horizontal shaft to the fourth vertical shaft.

9. A motor vehicle having a front axle housing with a pair of wheel shafts therein, each having a driven gear thereon, and a wheel connected thereto to rotate in a constant plane, a pair of transmission shafts, each having a transmission gear, meshing one with the other, and each transmission shaft having a driving gear meshing with one of the driven gears, a pair of slidable rods, each having a gear shifting device connected thereto to shift a driving gear out of mesh with a driven gear, and means on the opposite movement of said rod to bring said latter driving and driven gears into mesh, means to at will control the movement of each of said rods, one independently of the other, a pair of rear wheels on the vehicle, and means to steer said rear wheels.

10. A motor vehicle as claimed in claim 9, means operatively connected with each of said rods to apply a brake to the wheel shaft when the drive to such shaft is discontinued.

11. A motor vehicle having a pair of driving wheels, an axle for each wheel, a vertical rotatable power shaft having a pinion, a pair of vertical transmission shafts, each having a transmission gear, said transmission gears meshing, and one of the transmission gears meshing with the pinion, a beveled driving gear on each vertical shaft meshing with a beveled driven gear on each axle, an operating lever connected to each vertical transmission shaft, means to operate either or both levers to raise or lower the gears on each transmission shaft and thereby disconnect or connect the drive to either of said axles.

12. A motor vehicle having an axle housing with two drive axles in alignment, each having a road wheel thereon, each axle having a driven gear, a vertical rotatable power shaft having a pinion, a pair of vertical transmission shafts each having a transmission gear thereon in mesh, one of said gears meshing with the pinion, a shiftable driving gear on each transmission shaft, a driven gear on each axle meshing therewith, and means to raise and lower either or both of the driving gears on the transmission shafts to bring same out of or into mesh with the driven gears on the axles.

13. A motor vehicle as claimed in claim 12, the transmission gears being vertically shiftable, one of said gears being wider than the other to maintain said transmission gears always in mesh.

14. A motor vehicle having an axle housing with an axle formed of two separate aligned shafts, each having a wheel thereon and a driven gear, a vertical rotatable power shaft having a pinion, a pair of vertical transmission shafts, each having a transmission gear, said transmission gears being in mesh, and one transmission gear meshing with the pinion, a driving gear on each transmission shaft meshing with a driven gear on an axle shaft, means to raise or lower either or both sets of gears on the transmission shafts, and a spring means normally urging said gears downwardly.

15. A motor vehicle as claimed in claim 14, a brake applying device operatively connected to the means for raising and lowering the gears on the transmission shafts to apply a brake to the axle shafts when the drive and driven gears are out of mesh.

16. A motor vehicle having an axle housing with an axle formed of two shafts in alignment, each having a wheel thereon and a driven gear, a pair of vertical transmission shafts, each having a transmission gear thereon, the transmission gears being in mesh, means to drive said transmission gears, a driving gear on each transmission shaft, means to urge the driving gears into mesh with the driven gears, a vertically movable bracket for each driving gear positioned to raise or lower such driving gear to shift either or both driving gears out of mesh or into mesh with the driven gears.

17. A motor vehicle as claimed in claim 16, each bracket having an arm with a brake, such brake engaging a shaft of the axle when the driving and driven gears are out of mesh.

18. A motor vehicle as claimed in claim 16, a pair of foot pedals, a vertically slidable rod operatively connected from each pedal to the bracket and forming the means for raising and lowering a bracket.

In testimony whereof I have signed my name to this specification.

HENRY CREMER.